United States Patent Office 3,436,239
Patented Apr. 1, 1969

---

3,436,239
CARBOXYLIC ACID ESTER TREATED PIGMENTS
Raoul Feld, Cleethorpes, Grimsby, England, assignor to Laporte Titanium Limited, London, England, a British company
No Drawing. Filed June 30, 1965, Ser. No. 468,622
Claims priority, application Great Britain, July 22, 1964, 29,608/64
Int. Cl. C09c 1/36, 3/00
U.S. Cl. 106—300    11 Claims

ABSTRACT OF THE DISCLOSURE

The invention relates to the treatment of pigment to improve the gloss and hiding power of a paint or lacquer in which the pigment is incorporated and to improve the dispersibility of the pigment in the paint or lacquer vehicle. The treatment agents comprise esters of carboxylic acid containing at least two hydroxy groups and at least one carboxylic acid group, all of the carboxylic groups being esterified.

---

The present invention relates to pigment. More particularly, it relates to processes for treating pigment particles to improve the gloss and/or hiding power of a paint, lacquer or other surface coating composition in which such pigment is incorporated.

Broadly, the process of the present invention comprises loading a mass of pigment particles with at least one certain organic additive compound by contacting the patricles with predetermined quantities of said additive compound while the latter is in a fluid state.

Preferably, the pigment comprises titanium dioxide in either the anatase or rutile form. If desired, it may comprise a composite pigment containing titanium dioxide or a colored pigment containing titanium dioxide. The anatase or rutile titanium dioxide may be pure or it may have small quantities of hydrated metal oxides such as hydrated alumina or an hydrated oxide of titanium present on the surfaces of the particles. Other pigmentary compounds that may be treated in accordance with the process of the invention include silica, blanc fixe, lithopone, barium carbonate, zirconia, zinc oxide, aluminum oxide, chrome yellow and phthalocyanine.

The additive compounds of this invention comprise organic compounds containing at least two hydroxy groups and at least one carboxylic acid ester group, all the carboxylic acid groups present in the compound being esterified. Preferably, the compound contains two hydroxy groups on adjacent carbon atoms. For example, a suitable compound having three hydroxy groups, two of which are on adjacent carbon atoms is n-propyl gallate:

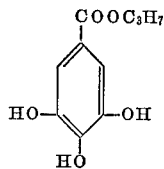

The additive compound, in addition to having at least two hydroxy groups on adjacent carbon atoms, also has at least two carboxylic acid ester groups. Such compounds comprise diesters of dihydroxy dicarboxylic acids, including, for example, dihydroxy maleic acid, tartaric acid, and the like.

The or each carboxylic acid ester group may be an alkyl, aryl, aralkyl or cycloalkyl ester group. Preferably, the or each ester group is an alkyl ester group in which the alkyl group contains from 2 to 20 carbon atoms.

Particularly satisfactory compounds which have been found to be suitable for use in the process of the invention include diethyl tartrate, dibutyl tartrate, di(2-ethylhexyl) tartrate, and the like.

In practicing the process of this invention, the pigment particles are contacted with an additive compound which is normally liquid or with a solution or dispersion of the compound (whether solid or liquid) in a suitable solvent or other liquid vehicle such as, for example, an alcohol, acetone, water or the like. While the pigment particles may be dry before the treatment, they preferably are premixed with water to form a paste, pulp or slurry.

After the pigment particles have been contacted with the additive compound, they preferably are exposed to heat at a temperature of up to about 120° C. for a period of time sufficient to remove substantially all water, solvent or other liquid that might be associated with the pigment. Thereafter, the treated particles can be milled or otherwise processed to break down any agglomerates or clumps that may have formed.

Thorough mixing of the pigment particles, whether dry or in the form of an aqueous paste, pulp, or slurry with the additive compound is necessary to insure uniform treatment of all the particles.

Pigment treatment in accordance with this invention may be effected at various stages of the process of producing the titanium dioxide pigment particles. However, it is necessary that the treatment be carried out after any other processing treatment which would destroy the effect of the additive compound on the particles as herein described. Preferably, the treatment is effected during what is conventionally referred to as the treatment or finishing step in titanium dioxide producing plants. It has been determined that particularly satisfactory results are obtained by spraying, atomizing or otherwise applying the desired quantities of the additive compound to the particles. If desired, the particles may be immersed in the additive compound while the latter is in a fluid state and then drained and dried. Alternatively, the particles may be treated during a wet milling operation and then dried.

The quantity of the additive compound with which the pigment particles are treated may vary within the range of from about 0.1% to about 5.0% by weight, based on the weight of the pigment particles, but preferably is within the range of from 0.5% to 1.5%, by weight.

The invention also provides a pigment, the particles of which have been contacted with a compound as hereinbefore defined. Moreover, it provides a paint, lacquer or other suitable surface coating composition containing a pigment treated as herein described.

Pigments treated in accordance with the invention have been incorporated with several different types of paint or lacquer media, for example, air-drying or stoving acrylic or alkyd media, and with each medium an improvement in the gloss and/or hiding power of the paint or lacquer formed has been observed. This is in contrast with other pigment treating processes which appear to impart only superficial improvement in gloss and/or hiding power when a particular type of medium is used.

To further illustrate, but not limit, the invention the following specific examples are set forth. The percentages given are by weight, unless otherwise indicated.

In the examples and table, the "percentage gloss" values set forth were obtained from measurements made using air-drying acrylic resin paints containing 37% by weight of the variously treated titanium dioxide pigment samples. In obtaining the values, the following procedure was used. A beam of light was shown on a black tile at an angle of incidence of 45°. The reflectance of that beam was measured. Films of the air-drying paints, containing the variously treated pigments, were applied to sheets of cellophane. A beam of light was shown on each of those films at an angle of incidence of 45°. In each instance, the reflectance of the beam was measured.

$$\frac{\text{Reflectance of the paint film}}{\text{Reflectance of the black tile}} \times 100\% = \text{percentage gloss}$$

In the examples and table, the "hiding power" values set forth were obtained from measurements made on several air-drying acrylic resin paints containing 37% by weight of the variously treated titanium dioxide pigment samples. The method used in obtaining the values is that described in the American Society for Testing Materials publication D 1738–60T, issued in 1960, with the substitution of Imperial gallons for U.S. gallons where appropriate. Any particular "hiding power" value represents the number of square feet of surface over which an Imperial gallon of the paint can be uniformly spread to produce a contrast ratio of C=0.98, the "contrast ratio" being defined in the ASTM publication.

In the examples and table, the "dispersibility" values were obtained in the following manner. 225 parts by weight of the variously treated pigment particles were mixed with 215 parts by weight of a linseed oil paint comprising pentaerythritol-modified alkyd resin, soya lecithin oil, and white spirits in the weight proportions of 100:20:570, respectively. During the mixing, samples of the paint were withdrawn at 1 minute intervals and tested on a Hegman gauge for fineness. The Hegman gauge reading gives a measure of the dispersion of the pigment in the medium. The rate of change of the Hegman gauge reading with time gives a measure of the rate of dispersion. After a certain time of mixing the Hegman gauge readings of the samples reach a constant maximum value. The "dispersibility" values given in the examples and table represent the specific Hegman gauge readings and the time which elapsed before the sample reached a constant maximum reading. A short period of time coupled with a high Hegman gauge reading indicates a good dispersibility and a high rate of dispersion.

Example I

A sample of a titanium dioxide pigment in which hydrated titanium dioxide and hydrated alumina (in amounts of 1.75% and 2.0%, calculated as $TiO_2$ and $Al_2O_3$ respectively, based on the weight of titanium dioxide in the pigment) were present on the surfaces of the pigment particles, was mixed with water to form a pulp containing 60% of titanium dioxide. The pulp was mixed in a paste blender with 1% of diethyl tartrate (based on the weight of the pigment) for a few minutes to give an even distribution of the diethyl tartrate throughout the pulp. The pulp was then dried at a temperature of about 120° C. and the pigment was milled in a fluid energy mill.

The percentage gloss, hiding power and dispersibility values for the treated pigment (measured as hereinbefore described) are given in the table, below.

Example II

Another sample of the pigment described in Example I was treated as described in that example, using 0.5% of dibutyl tartrate instead of diethyl tartrate. The percentage gloss and hiding power values for the pigment so treated are given in the table, below.

Example III

Example II was repeated, using 1% instead of 0.5% of dibutyl tartrate. The percentage gloss, hiding power and dispersibility values for the pigment thus treated are set forth in the table, below.

Example IV

Using another sample of the pigment described in Example I, the procedure described in that example was repeated using 1% of di-(2-ethyl hexyl) tartrate. The percentage gloss, hiding power and dispersibility values for that pigment are set forth in the table, below.

Example V

Using still another sample of the pigment described in Example I, the procedure described in that example was repeated using 1% of dibutyl tartrate. The hiding power value of the treated pigment was measured as hereinbefore described; the air-drying acrylic resin paint medium used in that procedure being replaced by a ling-oil soya-pentaerythritol modified alkyd resin air-drying oil paint medium. The hiding power value so obtained is set forth in the table, below.

Example VI

Example V was repeated, using 1% of di-(2-ethyl hexyl) tartrate instead of 1% of dibutyl tartrate. The hiding power of the treated pigment in the alkyd resin medium is set forth in the table, below.

Example VII

Example V was again repeated, using 0.25% of n-propyl gallate instead of 1% of dibutyl tartrate. The hiding power of the treated pigment in both the acrylic resin medium and the alkyd resin medium was measured; the values are set forth in the table, below.

TABLE

| Example | Percentage gloss in acrylic medium | Hiding power (sq. ft./Imp. gal.) | | Dispersibility in alkyd resin medium | |
|---|---|---|---|---|---|
| | | Acrylic medium | Alkyd medium | Hegman gauge reading | Time (mins.) |
| Untreated sample of pigment used in the examples | 68 | 421 | 696 | 5.0 | 2 |
| I | 75 | 414 | | 6.5 | 3 |
| II | 69 | 436 | | | |
| III | 72 | 443 | | 6.0 | 2 |
| IV | 79 | 450 | | 7.0 | 3 |
| V | | | 755 | | |
| VI | | | 740 | | |
| VII | | 450 | 740 | | |

While the invention has been described with respect to what at present are believed to be preferred embodiments thereof, it will be understood, of course, that certain changes, substitutions and other modifications may be made therein without departing from its true scope.

What is claimed is:

1. A process for the treatment of inorganic pigment particles which comprises contacting the particles with from about 0.1% to about 5.0% by weight, based on the weight of the pigment particles, of at least one organic additive compound while the latter is in a fluid state, and thereafter drying the particles, said additive comprising at least one compound selected from the group consisting of n-propyl gallate and diesters of tartaric acid in which the ester group is an alkyl group containing from 2–20 carbon atoms.

2. A process as set forth in claim 1 wherein the pigment particles are premixed with water prior to being contacted with said organic additive compound.

3. A process as set forth in claim 1 wherein the pigment particles, after being contacted with said organic additive compound, are dried by heating the same to a temperature of about 120° C.

4. A process as set forth in claim 1 wherein the pigment comprises titanium dioxide.

5. A process as set forth in claim 1 wherein the additive is diethyl tartrate.

6. A process as set forth in claim 1 wherein the additive is dibutyl tartrate.

7. A process as set forth in claim 1 wherein the additive is di(2-ethylhexyl) tartrate.

8. A new article of manufacture comprising titanium dioxide pigment particles which have been contacted with from about 0.1% to about 5.0% by weight, based on the weight of the pigment particles, of at least one additive compound selected from the group consisting of n-propyl gallate and diesters of tartaric acid in which the ester group is an alkyl group containing from 2–20 carbon atoms.

9. A new article of manufacture as set forth in claim 8 in which the additive compound is diethyl tartrate.

10. A new article of manufacture as set forth in claim 8 in which the additive compound is dibutyl tartrate.

11. A new article of manufacture as set forth in claim 8 in which the additive compound is di(2-ethylhexyl) tartrate.

References Cited

UNITED STATES PATENTS

| 2,233,358 | 2/1941 | Nutting | 106—308 |
| 2,882,177 | 4/1959 | Newton et al. | 106—308 |
| 3,022,185 | 2/1962 | Delfosse | 106—300 |
| 3,198,647 | 8/1965 | Kress | 106—308 |

FOREIGN PATENTS 548,307  11/1957  Canada.

TOBIAS E. LEVOW, *Primary Examiner.*

SAMUEL E. MOTT, *Assistant Examiner.*

U.S. Cl. X.R.

106—308, 288, 294, 296, 302, 306, 299